US008746436B2

(12) United States Patent
Yohe et al.

(10) Patent No.: US 8,746,436 B2
(45) Date of Patent: Jun. 10, 2014

(54) APPARATUS AND METHOD FOR SEPARATING ARTICLES SUSCEPTIBLE TO COHESIVE GROUPING

(71) Applicant: Dyco, Inc., Bloomsburg, PA (US)

(72) Inventors: Peter D. Yohe, Bloomsburg, PA (US); Ronald H. Cordingly, Berwick, PA (US)

(73) Assignee: Dyco, Inc., Bloomsburg, PA (US)

( * ) Notice: Subject to any disclaimer, the term of this patent is extended or adjusted under 35 U.S.C. 154(b) by 106 days.

(21) Appl. No.: 13/644,623

(22) Filed: Oct. 4, 2012

(65) Prior Publication Data

US 2014/0097064 A1  Apr. 10, 2014

(51) Int. Cl.
*B65G 47/26* (2006.01)

(52) U.S. Cl.
USPC ......... 198/433; 198/428; 198/458; 198/460.1

(58) Field of Classification Search
CPC ..... B65G 47/26; B65G 47/086; B65G 47/766
USPC ......... 198/370.07, 370.11, 418.6, 418.7, 428, 198/433, 458, 460.1
See application file for complete search history.

(56) References Cited

U.S. PATENT DOCUMENTS

| | | | | |
|---|---|---|---|---|
| 2,941,650 | A * | 6/1960 | Clinton | 198/430 |
| 3,557,932 | A * | 1/1971 | Laub, III | 198/433 |
| 4,724,947 | A * | 2/1988 | Opperthauser | 198/433 |
| 4,753,590 | A * | 6/1988 | Milholen | 425/304 |
| 4,966,272 | A * | 10/1990 | Raudat | 198/446 |
| 5,129,643 | A * | 7/1992 | Johnson et al. | 271/216 |
| 5,310,300 | A * | 5/1994 | Crabb et al. | 414/280 |
| 5,692,361 | A * | 12/1997 | Ziegler et al. | 53/447 |
| 5,799,770 | A * | 9/1998 | Radewagen | 198/432 |
| 6,202,827 | B1 * | 3/2001 | Drewitz | 198/433 |
| 6,296,103 | B1 * | 10/2001 | Gross | 198/429 |
| 6,336,258 | B2 * | 1/2002 | Ueding et al. | 19/159 A |
| 6,516,939 | B1 * | 2/2003 | Schmidt et al. | 198/458 |
| 6,837,360 | B2 * | 1/2005 | Schoeneck | 198/426 |
| 7,416,072 | B2 * | 8/2008 | Gosset | 198/429 |
| 8,322,514 | B2 * | 12/2012 | Bonnain et al. | 198/430 |

* cited by examiner

*Primary Examiner* — Douglas Hess
(74) *Attorney, Agent, or Firm* — McNees Wallace & Nurick LLC

(57) ABSTRACT

An apparatus for separating articles susceptible to cohesive grouping includes a first collection area having an end. A first conveying device collects and conveys an array of articles in a plurality of rows toward a second collection area receiving at least one row of articles from the end of the first collection area. A barrier positioned in close proximity to the end of the first collection area controls movement of the article rows between the end of the first collection area and the second collection area. A separator is positionable between the end of the first collection area and at least a portion of the second collection area. Upon the second collection area receiving the at least one row of articles from the end of the first collection area, the separator maintains a spacing between the row of articles controllably positioned along the end of the first collection area by the barrier.

20 Claims, 15 Drawing Sheets

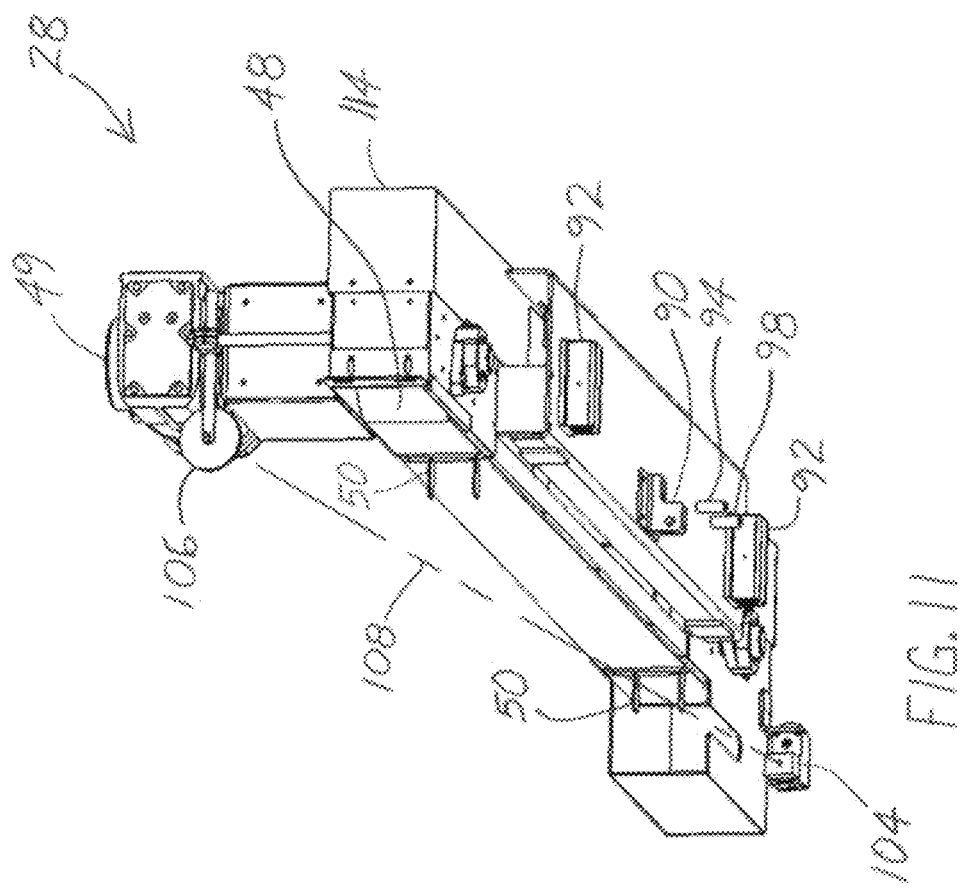

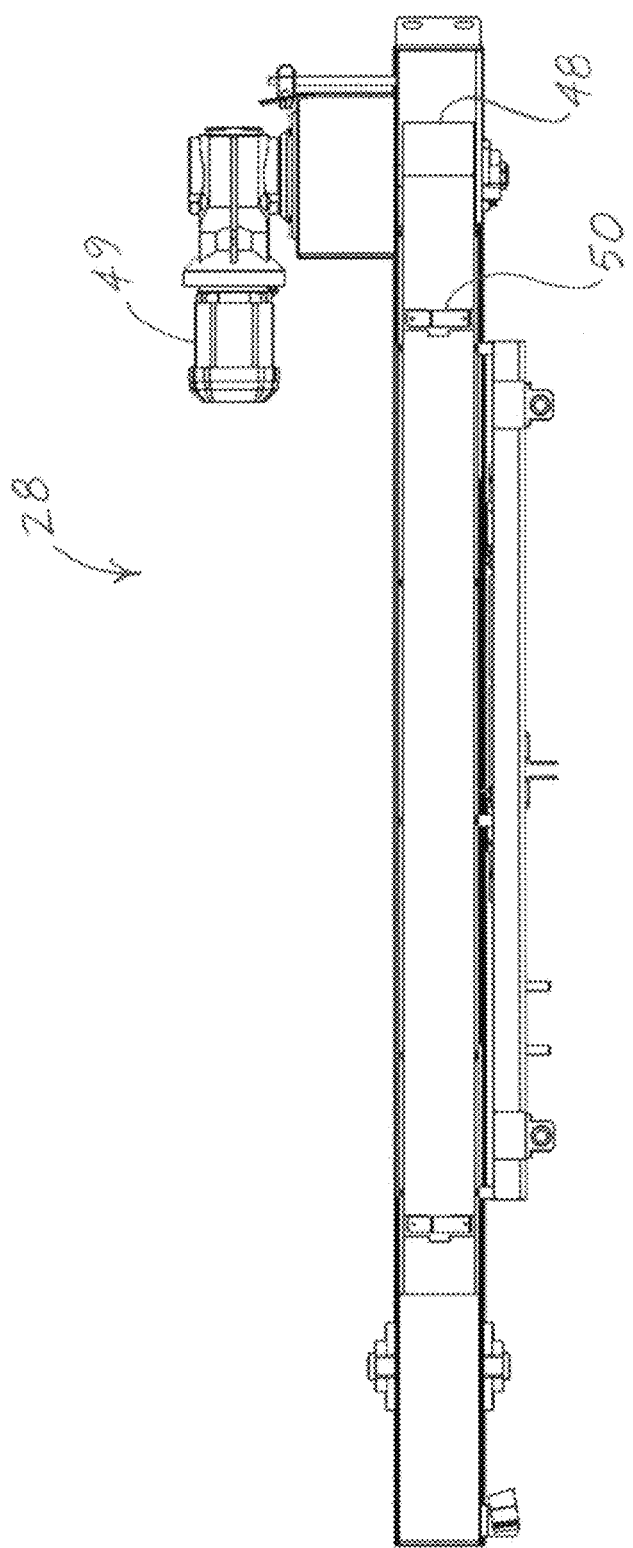

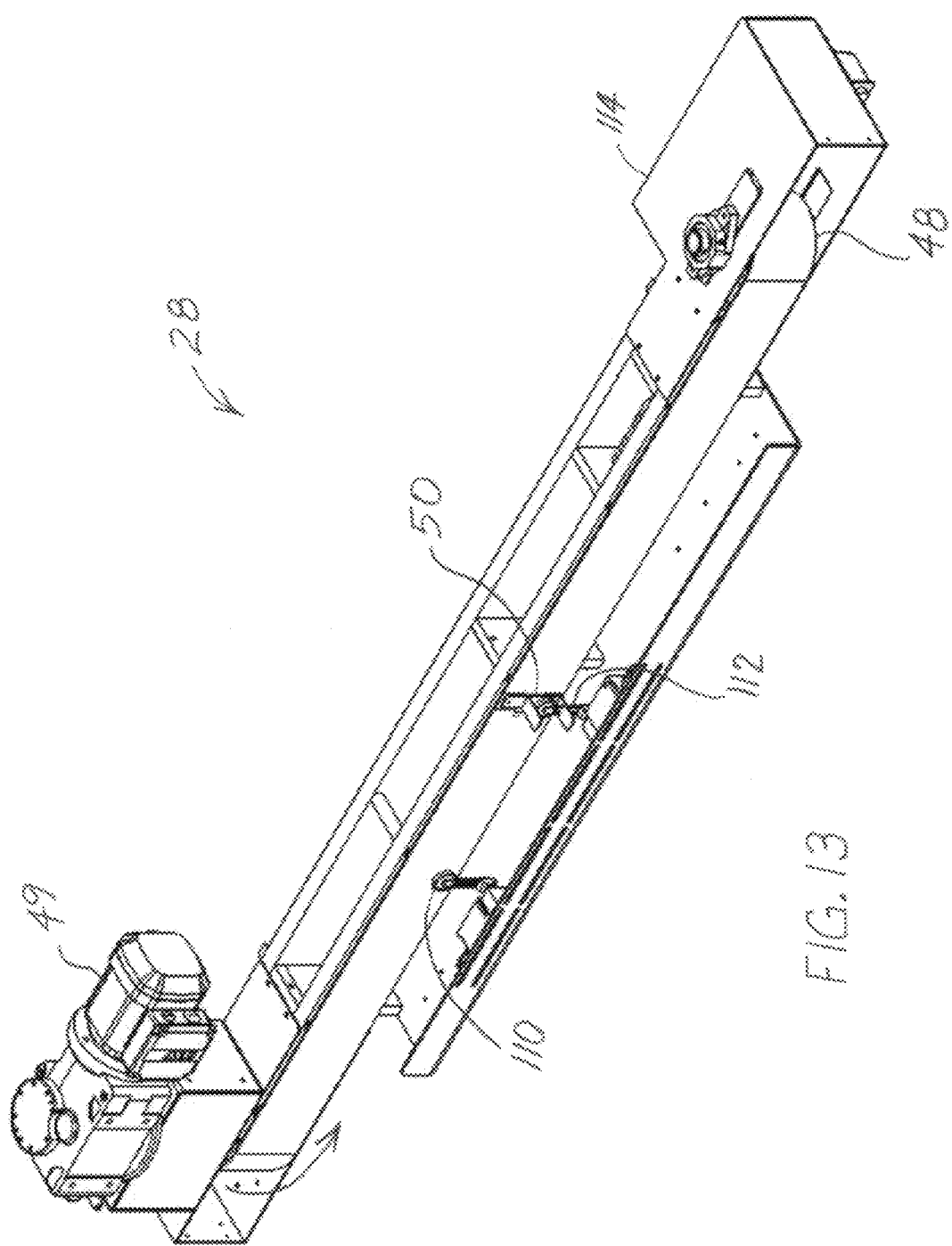

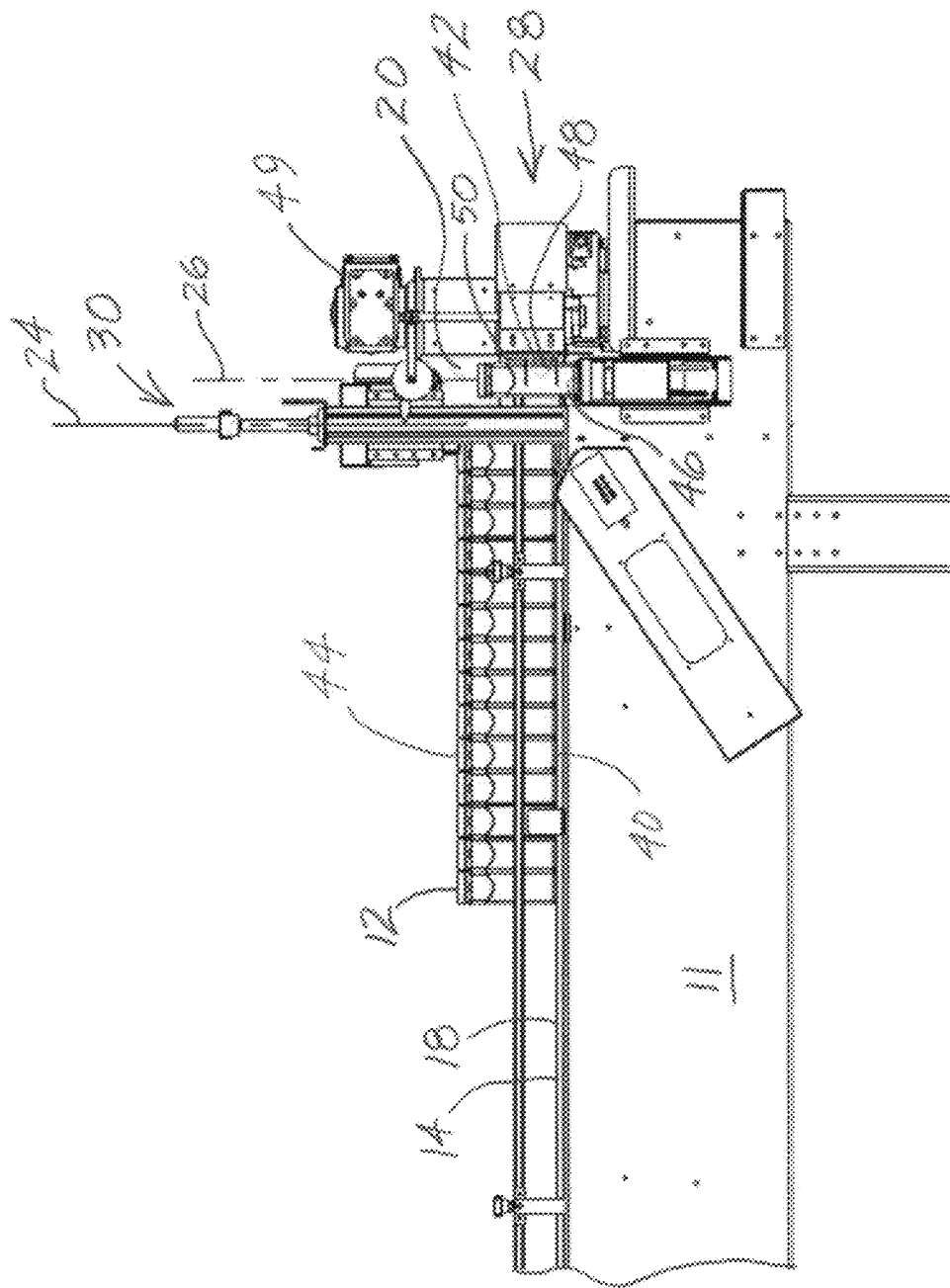

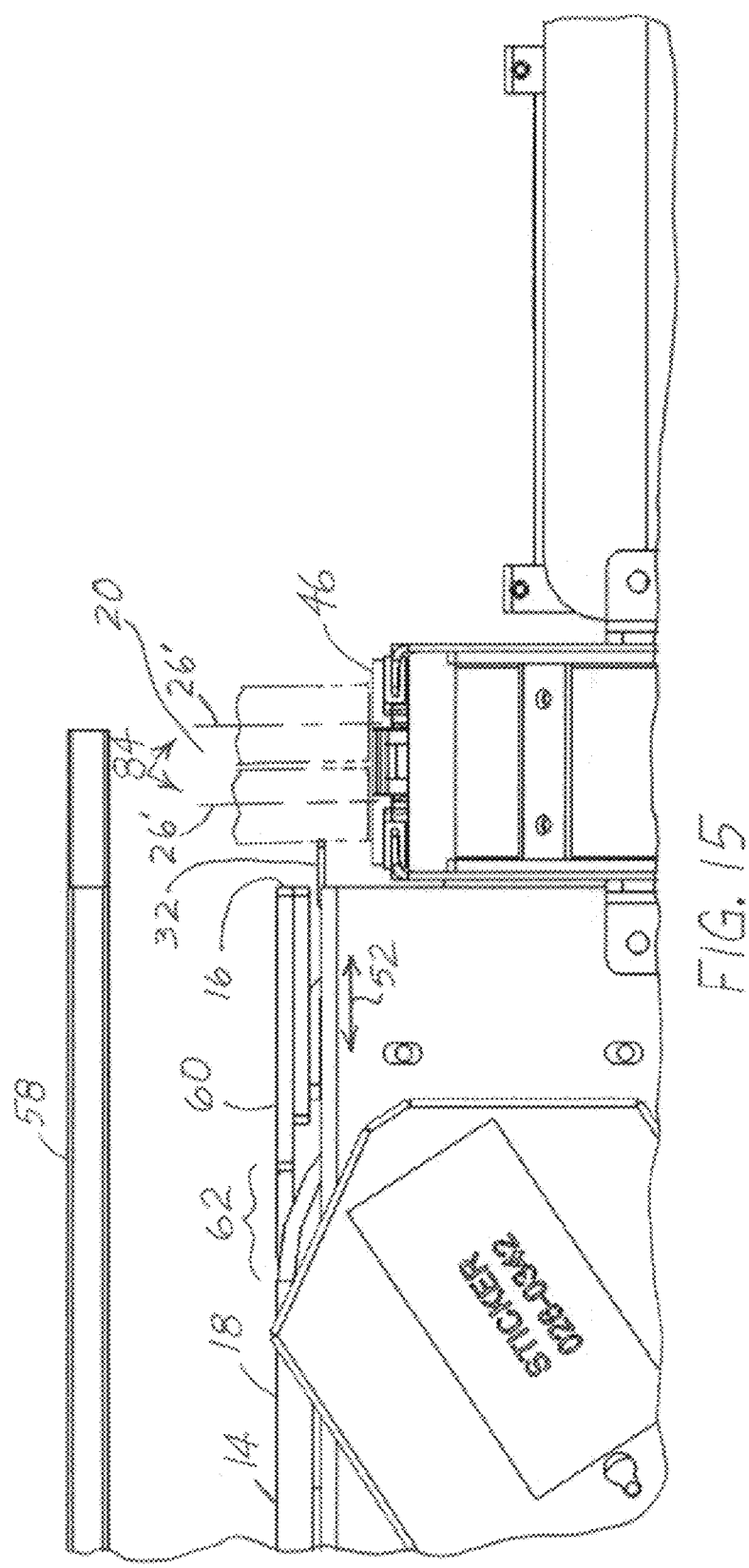

APPARATUS AND METHOD FOR SEPARATING ARTICLES SUSCEPTIBLE TO COHESIVE GROUPING

FIELD OF THE INVENTION

The present invention generally relates to an apparatus and method associated with handling articles. The present invention additionally relates to an apparatus and method for separating articles susceptible to cohesive grouping.

BACKGROUND

In the manufacture and packaging of articles, such as blow-molded articles, including hollow, plastic containers or bottles, a conveyor arrangement is often used to convey the articles between the manufacturing/packaging stations. Advances in article compositions, such as polyethylene terephthalate (PET), permit the manufacture of strong, lightweight articles. Additionally, due to PET articles possessing satisfactory barrier to gas transmission, primarily oxygen and carbon dioxide, they are often used as containers for carbonated soft drinks.

However, there are challenges associated with the manufacture and use of PET articles. For example, PET articles exhibit a mutual "sticking" effect, or susceptibility to cohesively group together. This behavior can make high-speed handling of the PET articles difficult. For example, the effect of this sticking phenomenon with preforms packed into a box is a lower than optimum packing density and correspondingly higher transportation cost per preform. The effect further manifests itself when unloading these boxes onto a blowing line, where the preforms tend not to flow smoothly into the automatic unscramblers and other register machinery. This can then result in less than optimum preform feed rates to the blowing machine. Bottles sticking together reduce conveying efficiency, and hence, overall filling speed on a filling line, and create further challenges during bottle palletizing/depalletizing. In sheet manufacture, sticking effects create problems in sheet unrolling and cutting after storage, as well as with de-nesting of thermoformed articles.

Accordingly, there is a need for an apparatus and method for separating articles susceptible to cohesive grouping associated with the manufacture and/or packaging of articles.

SUMMARY OF THE INVENTION

In an exemplary embodiment, an apparatus for separating articles susceptible to cohesive grouping includes a first collection area having an end. The first collection area includes a first conveying device for collecting and conveying an array of articles arranged in a plurality of rows toward a second collection area. The second collection area is configured to receive at least one row of articles from the end of the first collection area. The second collection area includes a second conveying device for conveying the at least one row of articles from the second collection area. A selectably movable barrier is positioned in close proximity to the end of the first collection area for controlling movement of the at least one row of articles between the end of the first collection area and the second collection area. A selectably movable separator is positionable between the end of the first collection area and at least a portion of the second collection area. Upon the second collection area receiving the at least one row of articles from the end of the first collection area, the separator maintains a spacing between the row of articles controllably positioned along the end of the first collection area by the barrier.

In a further embodiment, a method for separating articles susceptible to cohesive grouping includes providing a first collection area having an end. The first collection area includes a first conveying device for collecting and conveying an array of articles arranged in a plurality of rows toward a second collection area. The second collection area is configured to receive at least one row of articles from the end of the first collection area. The method further includes conveying the at least one row of articles from the end of the first collection area to the second collection area. The method further includes separating the at least one row of articles in the second collection area from an adjacent row of articles arranged along the end of the first collection area. The method further includes conveying the at least one row of articles from the second collection area while maintaining separation from the adjacent row of articles arranged along the end of the first collection area.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 11 is a lower perspective view of an exemplary second conveying device according to the disclosure.

FIG. 12 is a side view of the second conveying device of FIG. 11 according to the disclosure.

FIG. 13 is a reverse upper perspective view of the second conveying device of FIG. 11 according to the disclosure.

FIG. 14 is an enlarged, partial side view of the apparatus of FIG. 1 according to the disclosure.

FIG. 15 is taken along line 8-8 of FIG. 6 of a junction between first and second collection areas and showing an exemplary apparatus according to the disclosure.

DETAILED DESCRIPTION

Specific embodiments of apparatus and method for conveying and separating articles according to the disclosure are described below with reference to the drawings.

The term "sticking" effect, susceptibility to cohesive grouping and the like are intended to refer to articles, such as comprised of polyethylene terephthalate (PET) that have a tendency to be attracted to each other. This tendency for articles to be attracted to each other is not limited to newly manufactured articles, such as articles that have been bagged, or surrounded by a layer of material and left substantially undisturbed for extended periods of time prior to handling. This tendency, which is believed to occur as a result of static friction, intermolecular attraction, surface roughness, a combination of one or more of the above, or other reasons that are not further discussed herein, provide challenges associated with handling, e.g., high-speed handling, of these articles. The apparatus and method for conveying and separating articles according to the disclosure have been effective in addressing these challenges.

Figure 1:
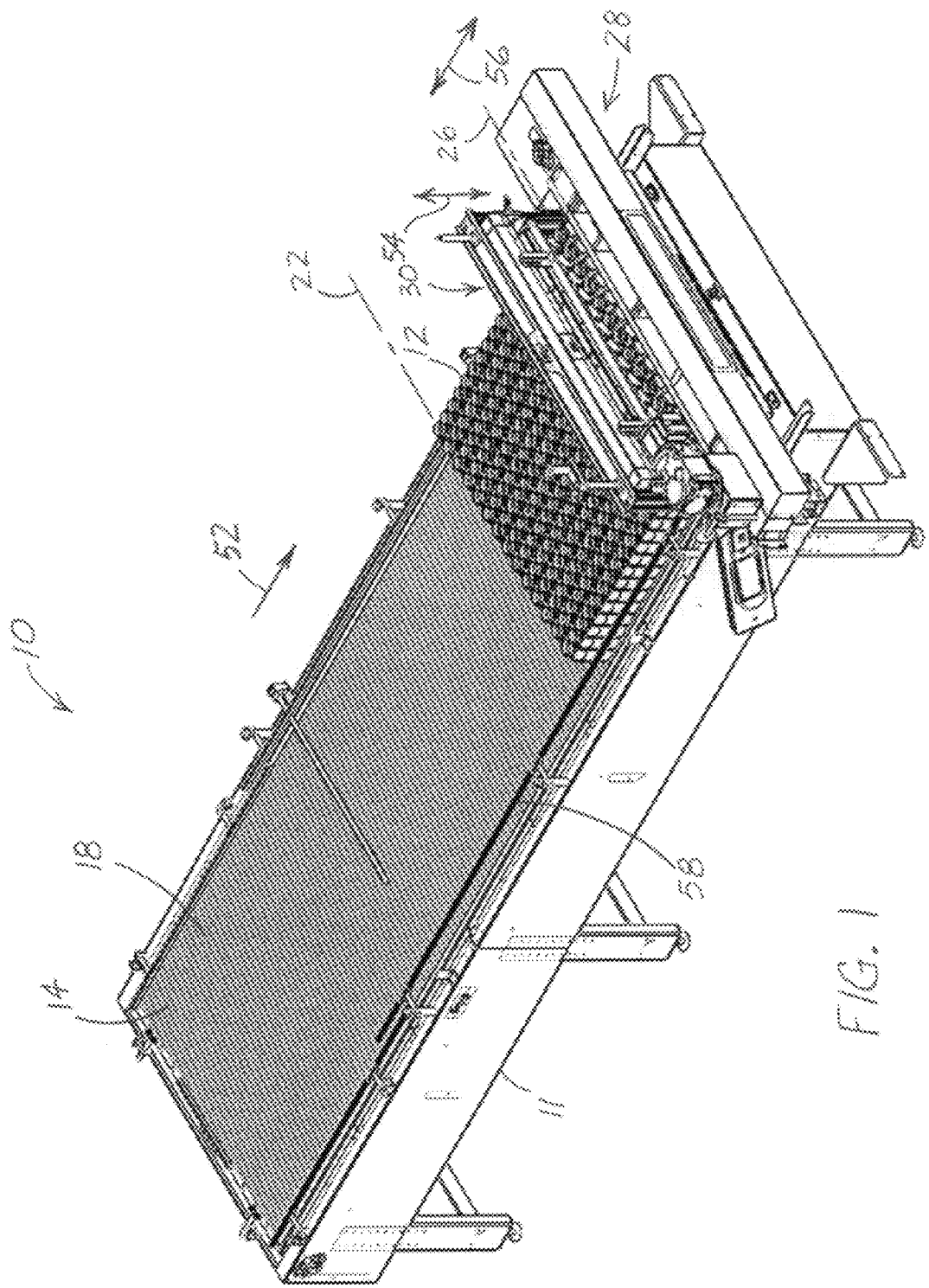
FIG. 1 is an upper perspective view of an exemplary apparatus according to the disclosure.
Figure 2:
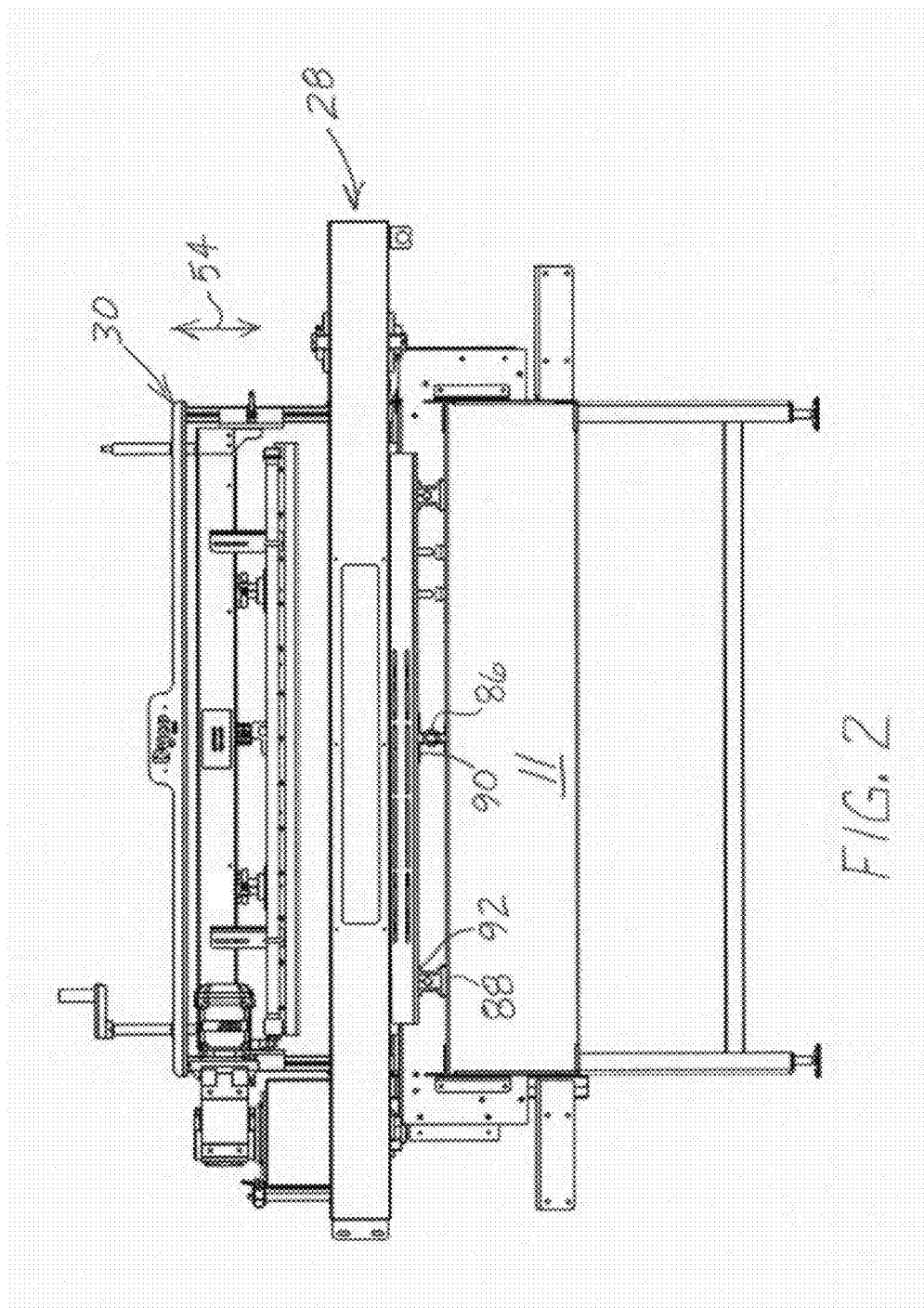
FIG. 2 is an end view of the apparatus of FIG. 1 according to the disclosure.
Figure 3:
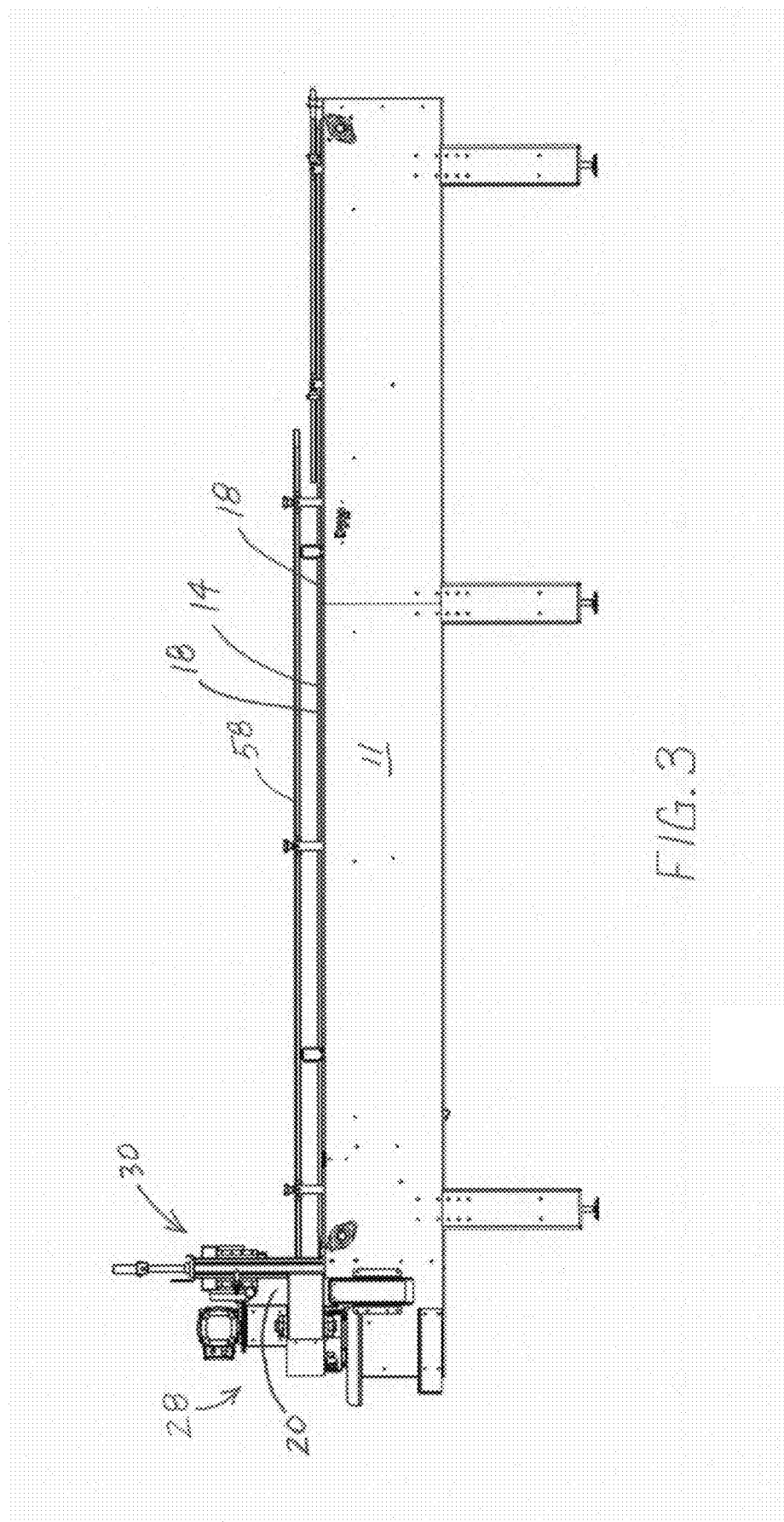
FIG. 3 is a side view of the apparatus of FIG. 1 according to the disclosure.
Figure 4:
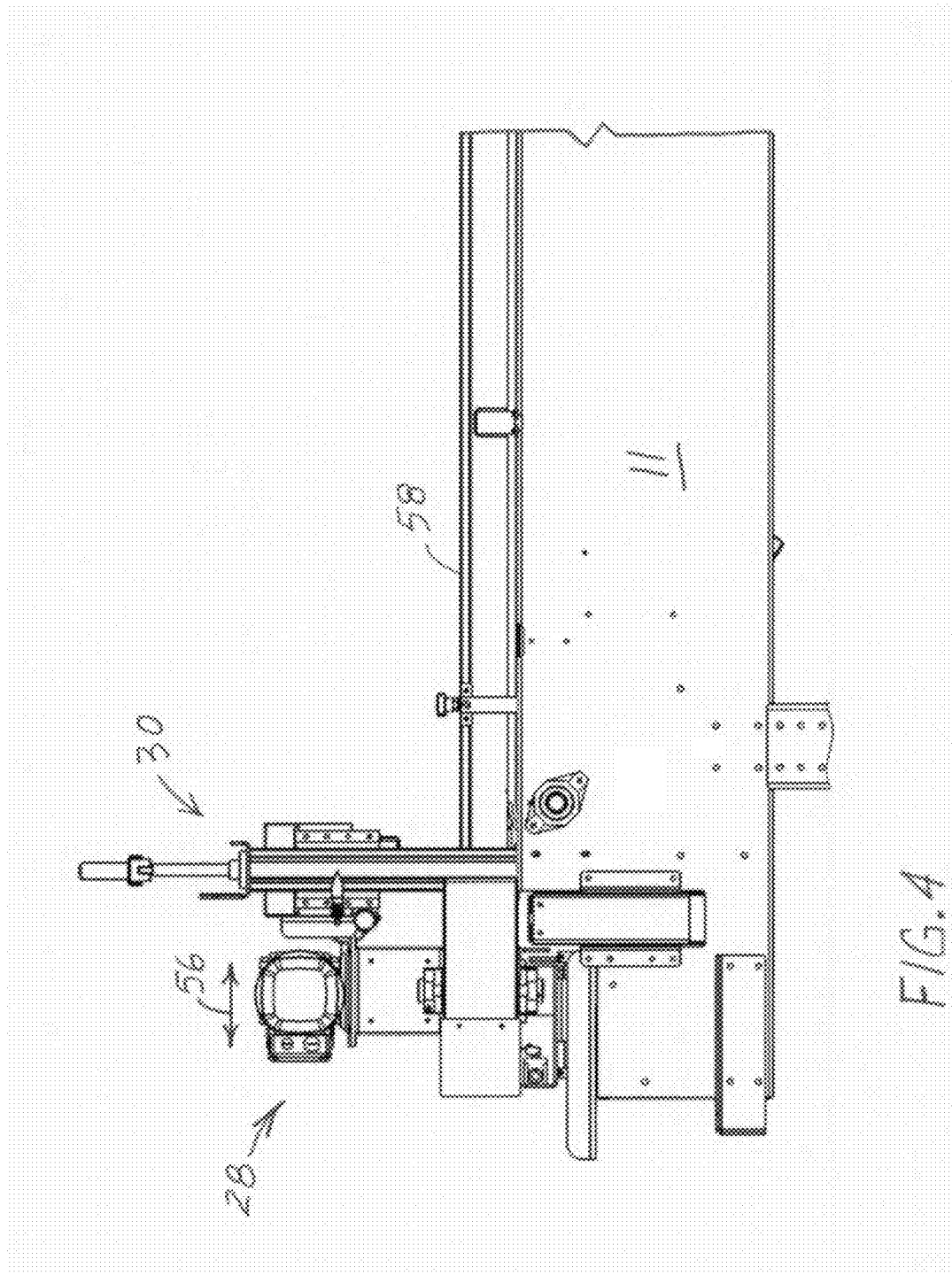
FIG. 4 is an enlarged, partial side view of the apparatus of FIG. 3 according to the disclosure.
Figure 5:
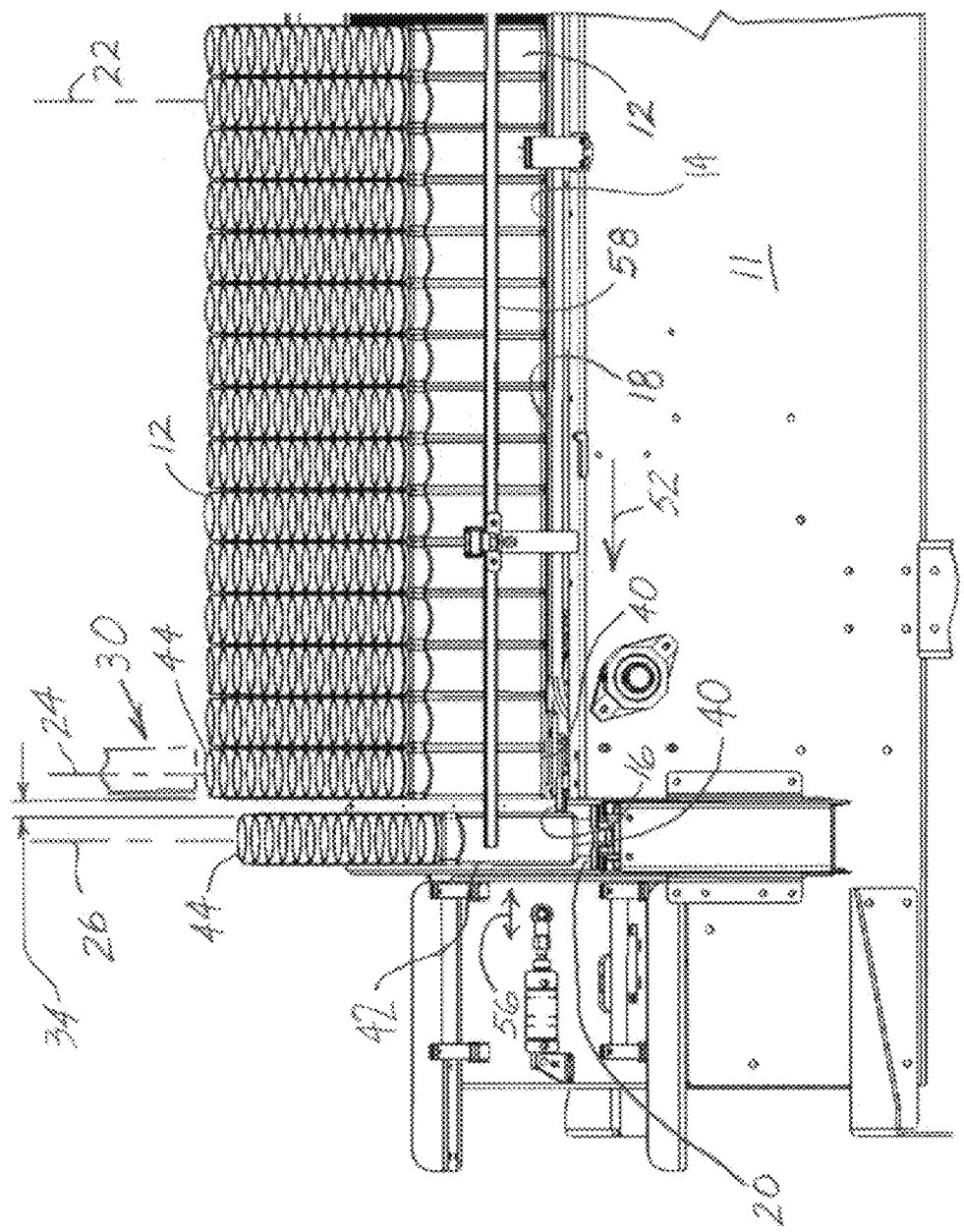
FIG. 5 is an enlarged partial upper perspective cutaway view of the apparatus of FIG. 1 according to the disclosure.

As collectively shown in FIGS. 1-5, an exemplary embodiment of an apparatus 10 for separating articles 12 includes a frame 11. Frame 11 supports a first collection area 14 that includes a first conveying device 18, such as a continuous belt or mat for conveying an array or a plurality of articles 12 placed on first collection area 14. Articles 12 are arranged in rows, such as an article row 22 in FIG. 1. In one embodiment, during operation of apparatus 10, first conveying device 18 operates continuously or at least substantially continuously. In another embodiment, first conveying device 18 operates intermittently, such as halting operating during loading an array or plurality of articles 12, or during a line back-up. In yet another embodiment, first conveying device operates continuously or intermittently. First conveying device 18, assisted by guides 58 positioned along opposed sides of frame 11, conveys article rows 22 along first collection area 14 toward a second collection area 20 in movement direction 52. A barrier 30 (FIG. 1, and shown in phantom in FIG. 5) is positioned in close proximity to an end 16 of first collection area 14, controlling movement of article rows along first conveying device 18 in movement direction 52 between the end 16 of first collection area 14 and second collection area 20. As shown in FIG. 5, an article row encountering barrier 30 is re-identified as article row 24 and an article row received in second collection area 20 is re-identified as article row 26. Once article row 26 (FIG. 5) is received in second collection area 20, article row 26 and adjacent article row 24 encountered by barrier 30 will be continuously separated from each other, including while article row 26 is conveyed from second collection area 20 by a second conveying device 28, as will be discussed in further detail below.

Figure 6:
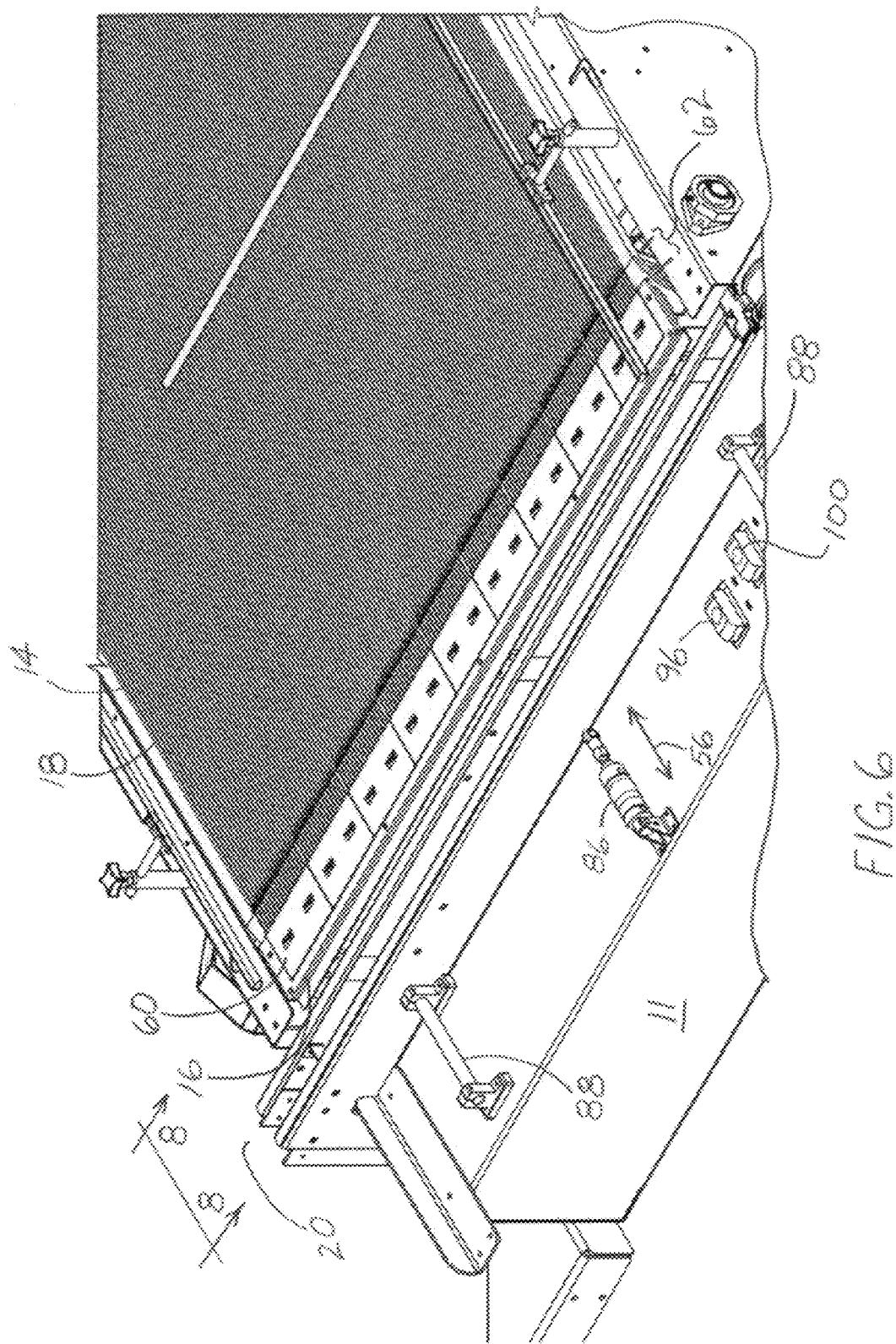
FIG. 6 is a partially rotated upper perspective cutaway view of the apparatus of FIG. 6 according to the disclosure.
Figure 10:
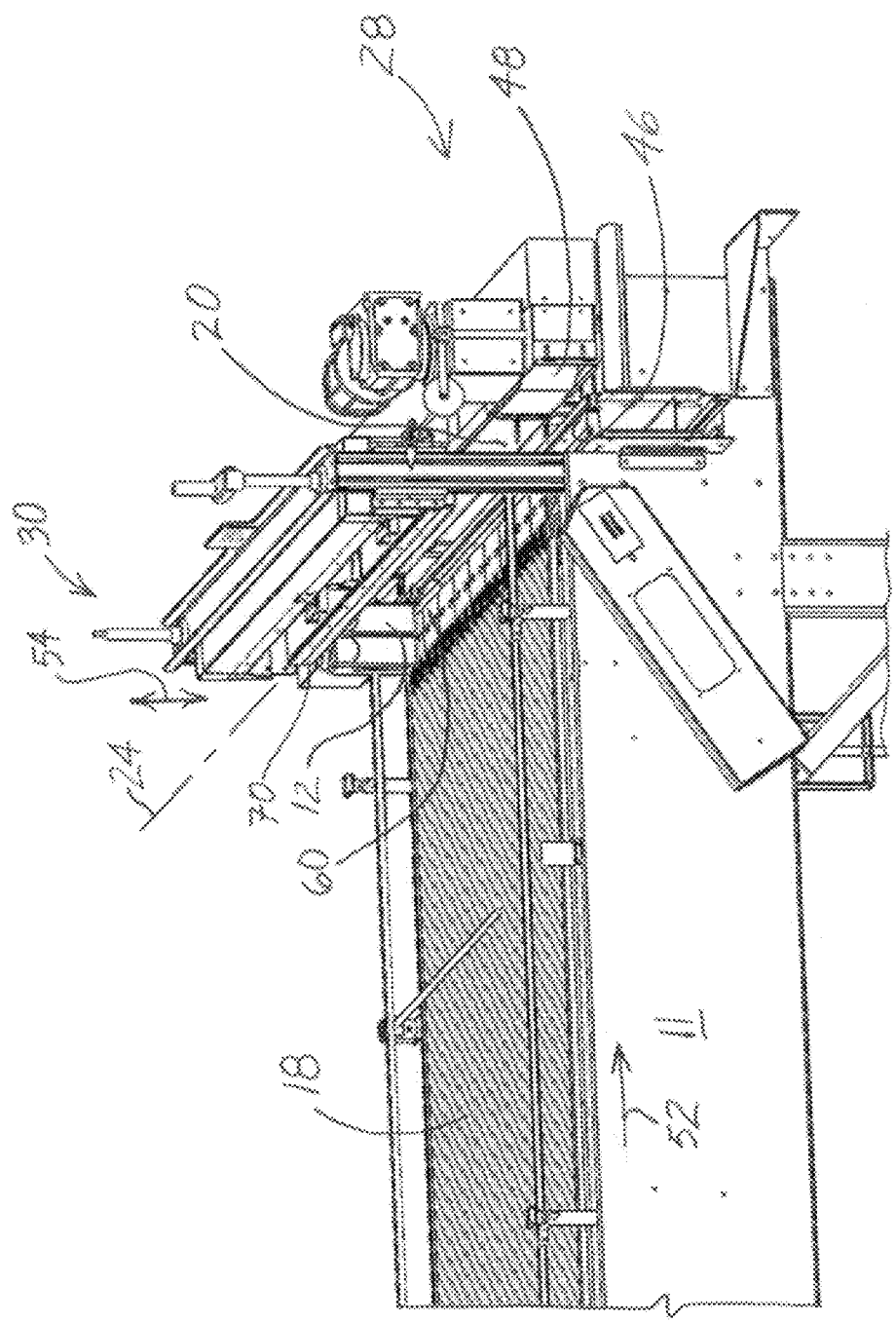
FIG. 10 is a partially rotated upper perspective of the apparatus of FIG. 1 according to the disclosure.

As collectively shown in FIGS. 5, 6 and 10, first conveying device 18 is positioned in close proximity to a plate 60 terminating at end 16 of first collection area 14 opposite first conveying device 18. A transition region 62 is positioned between first conveying device 18 and plate 60, the transition region of plate 60 resembling a comb, permitting first conveying device 18 to pass between the teeth of plate 60 in transition region 62. That is, the portion of plate 60 positioned between end 16 and transition region 62 is stationary relative to frame 11 of apparatus 10. Therefore, even if first conveying device 18 is operating continuously, an article row 22 conveyed in movement direction 52 by first conveying device 18 would not be further conveyed in movement direction 52 upon moving past transition region 62 of plate 60. An article row positioned between end 16 and transition region 62 of plate 60 is re-identified as article row 24 (FIG. 5). However, if first conveying device 18 is operating continuously, subsequent article rows 22 supported and conveyed by first conveying device 18 in movement direction 52 would provide a conveying force in movement direction 52 to article row 24 that would likewise urge article row 24 in movement direction 52 toward second collection area 20.

As further collectively shown in FIGS. 5, 6, 7 and 10, barrier 30 selectably controls movement in movement direction 52 of article row 24 (and subsequent article rows supported and conveyed by first conveying device 18). Barrier 30 includes an inverted U-shaped frame 31 that is secured to frame 11 in general alignment with plate 60. A subframe 64 is secured to frame 31 by adjustment device 66, such as an interconnected chain/screw drive mechanism that is movable in movement direction 54. A pressurized gas delivery device 38 may be adjustably secured to subframe 64 by bracket assemblies 76. Pressurized gas delivery device 38 includes a tube 74 extending substantially transversely relative to movement direction 52 of first conveying device 18. As shown, tube 74 includes a plurality of nozzles 78 arranged to deliver pressurized gas to one or more of article row 24 and/or article row 26, for reasons to be further discussed below. Subframe 64 includes a member or clamp head 70 that is movably connected to subframe 64 in movement direction 54 by actuators 72. Actuators 72 may be powered by pneumatic, hydraulic, electronic drive motor or other suitable source of movement of member or clamp head 70.

Figure 7:
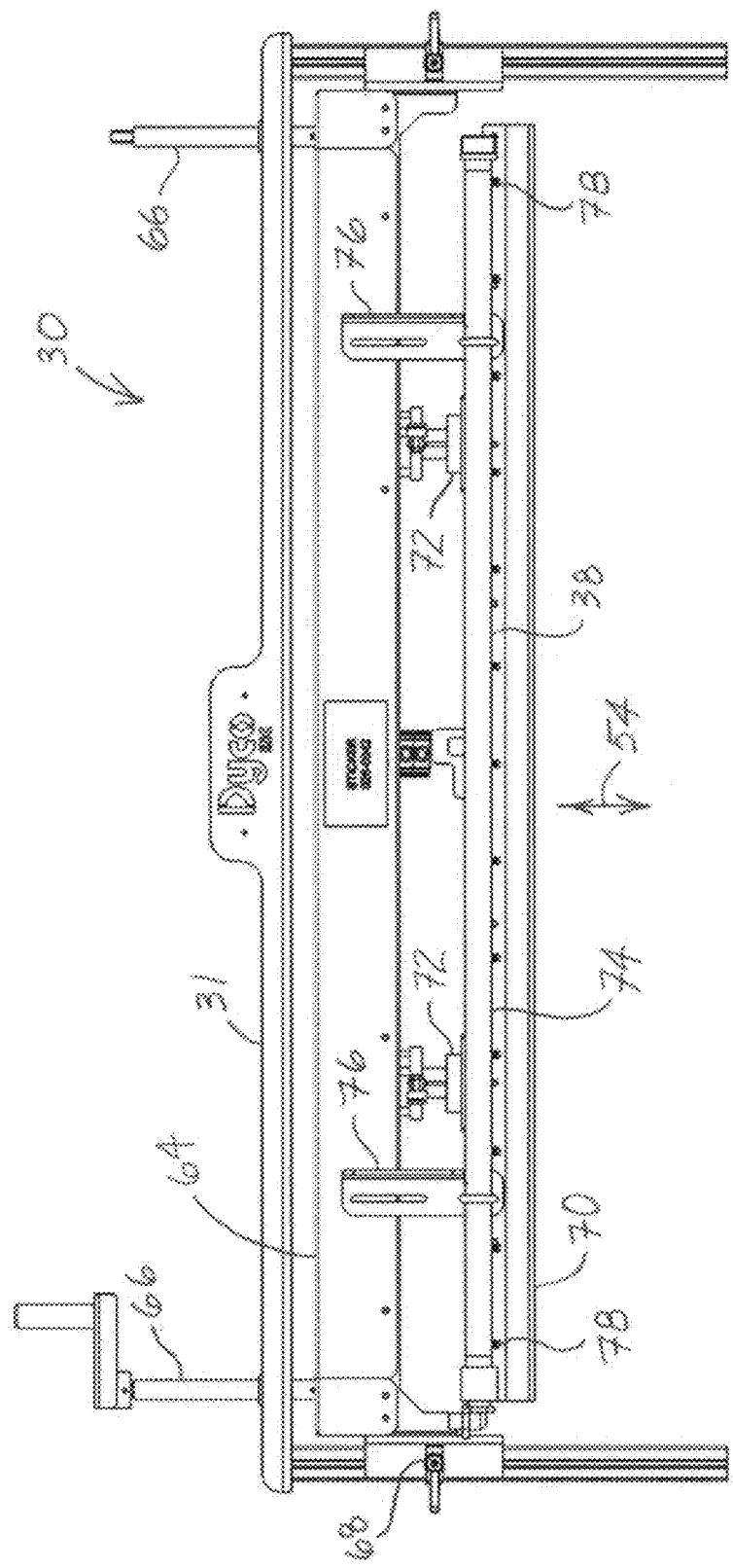
FIG. 7 is an end view of an exemplary barrier of the apparatus according to the disclosure.

As further shown collectively in FIGS. 7 and 10, member or clamp head 70 of barrier 30 is urged into selective movement in movement direction 54. In another embodiment, clamp head 70 may move in one or more directions other than movement direction 54 toward or away from end 16 of first collection device 14. If clamp head 70 is urged in movement direction 54 away from first conveying device 18, article 24 is permitted to move in movement direction 52 over and past plate 60 to second collection area 20. However, if member or clamp head 70 is urged in movement direction 54 toward first conveying device 18, a compressive force is applied between clamp head 70 and plate 60 to opposed sections 40, 44 (FIG. 5) of article row 24 in order to prevent movement of article row 24 in movement direction 52. That is, a compressive force generated between member or clamp head 70 and plate 60 and applied to opposed sections 40, 44, such as respective bottom and top surfaces of articles of article row 24 prevents article row 24 from moving past end 16 of first collection area 14 to second collection area 20. Once article row 24 is received in second collection area 20, article row 24 is re-identified as article row 26.

Figure 8:
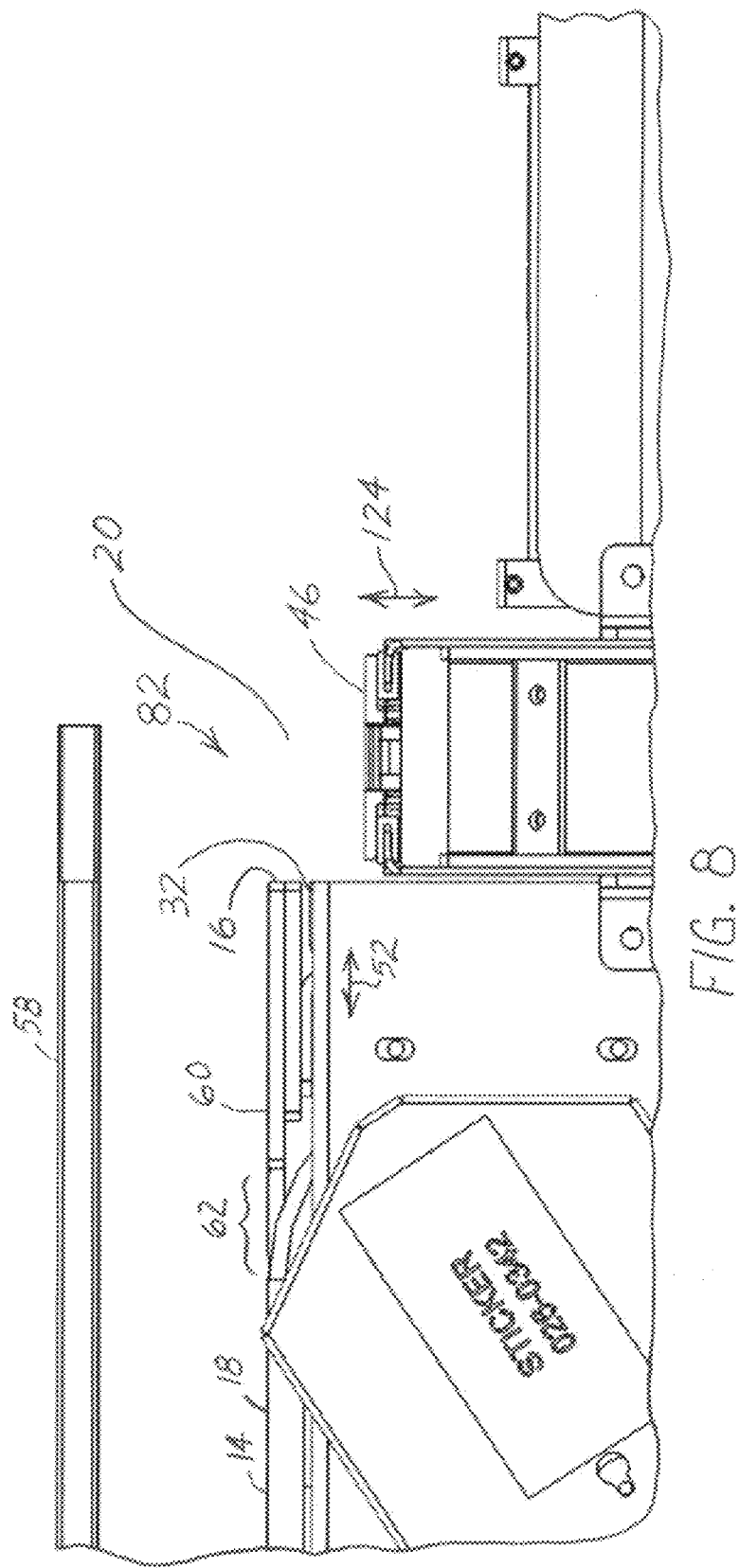
FIG. 8 is taken along line 8-8 of FIG. 6 of a junction between first and second collection areas and showing an exemplary separator in a retracted position according to the disclosure.
Figure 9:
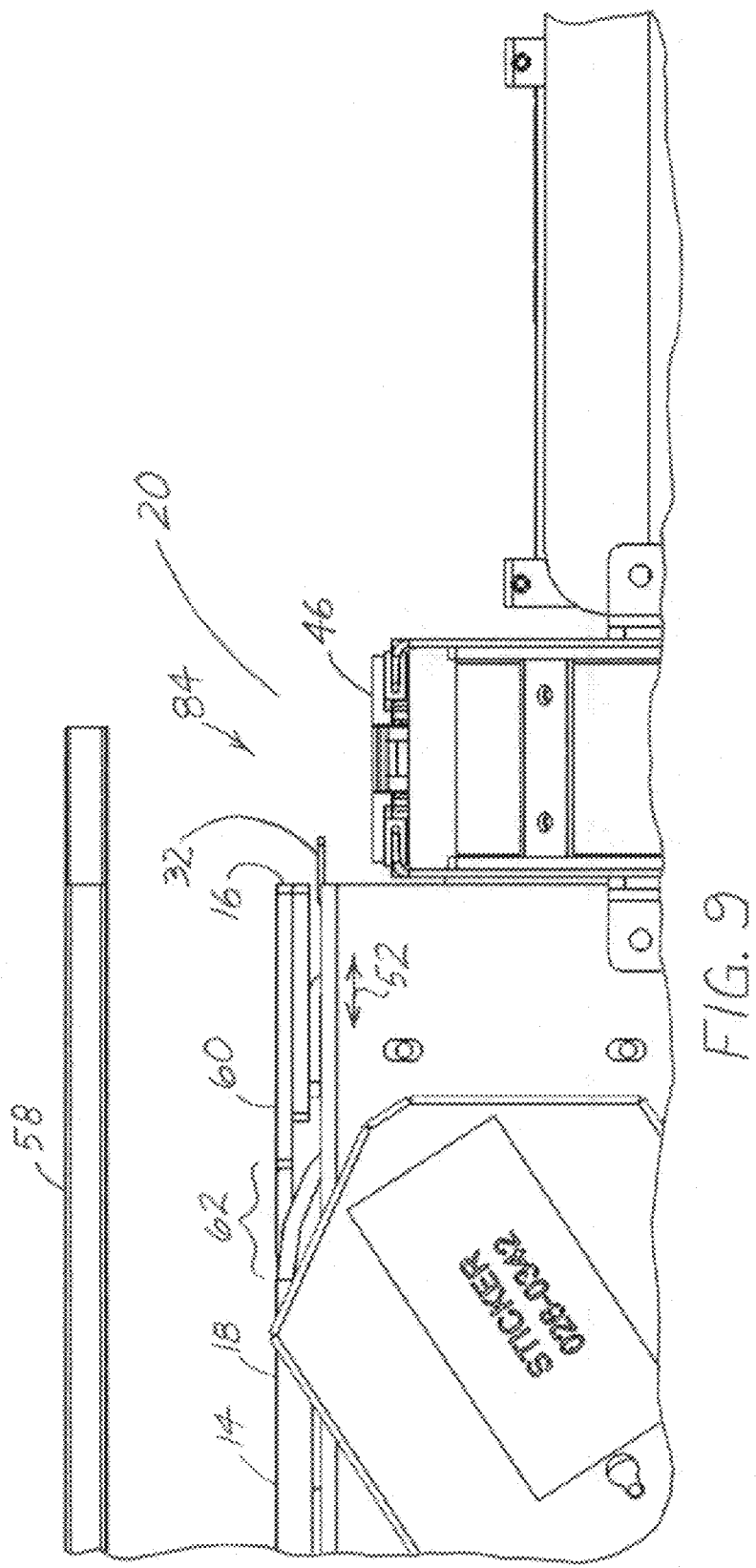
FIG. 9 is taken along line 8-8 of FIG. 6 of a junction between first and second collection areas and showing an exemplary separator in an extended position according to the disclosure.

As collectively shown in FIGS. 5 and 6 and FIGS. 8 and 9, which are taken along line 8-8 of FIG. 6, a separator 32 such as an angle is positioned in close proximity to plate 60, and more specifically, in close proximity to end 16 of first collection area 14. As shown in FIG. 8, separator 32 is located in a retracted position 82 when clamp head 70 of separator 32 (FIG. 10) is moved in movement direction 54 away from first conveying device 18 to permit article row 24 to travel from end 16 of first collection area 14 to be received in second collection area 20 (and being re-identified as article row 26; FIG. 14). As shown in FIG. 9, separator 32 is located in an extended position 84 when clamp head 70 of separator 32 (FIG. 10) is moved in movement direction 54 toward first conveying device 18, applying a compressive force to opposed sections of article row 24 to prevent article row 24 from moving away from end 16 of first collection area 14. Separator 32 in its extended position 84 maintains a spacing 34 or separation between article row 24 (secured in position in close proximity to end 16 of first collection area 14 by clamp head 70 of separator 32) and article row 26 (positioned in second collection area 20). Separator 32 remains in its extended position 84, separating article row 24 from article row 26, until article row 26 is conveyed from second collection area 20 by second conveying device 28, and second collection area 20 is ready to receive another article row as previously discussed.

As collectively shown in FIGS. 2, 5, 6 and 11, second conveying device 28 is utilized to receive article row 24 from end 16 the first collection area 14 in the second collection area 20 by movement of barrier 30 as previously discussed, whereupon article row 24 is re-identified as article row 26 once the article row is received in second collection area 20. Once article row 26 is received in second collection area 20, second conveying device 28 then conveys article row 26 from second collection area 20 for further processing of the articles.

As collectively shown in FIGS. 2, 5, 6 and 11, second conveying device 28 is slidably connected to frame 11 to travel or move in movement direction 56. As further shown in FIGS. 6 and 11, a pair of guides 88 and an actuator 86 are secured to frame 11 adjacent second collection area 20 opposite end 16 of first collection area 14. Actuator 86 is configured to move in movement direction 56 that is substantially parallel to movement direction 52 (FIG. 1) of first conveying device 18. Second conveying device 28 includes a pair of sleeves 92 to slidably correspond with the pair of guides 88. Similarly, bracket 90 which is secured to second conveying device 28 is configured to be received by an end of actuator 86 that is secured at its other end to frame 11.

To control the extent of movement of second conveying device 28 in movement direction 56, a proximity switch 96 secured to frame 11 corresponds to a protrusion 94 extending from second conveying device 28, and the proximity switch 100 secured to frame 11 corresponds to a protrusion 98 extending from second conveying device 28. That is, upon assembly of second conveying device 28 to frame 11, protrusions 94, 98 are positioned between corresponding proximity switches 96, 100. In response to a signal from a controller (not shown) to move second conveying device 28 in movement direction 56 toward second collection area 20, second conveying device 28 is directed in movement direction 56 toward second collection area 20 until protrusion 98 engages proximity switch 100, thereby halting further movement toward second collection area 20. Similarly, in response to a signal from the controller (not shown) to move second conveying device 28 in movement direction 56 away from second collection area 20, second conveying device 28 is directed in movement direction 56 away from second collection area 20 until protrusion 94 engages proximity switch 96, thereby halting further movement away from second collection area 20.

It is to be understood that second conveying device 28 is moved toward second collection area 20 substantially simultaneously as article row 24 is being moved toward and into second collection area 20 (article row 24 being re-identified as article row 26 upon the article row being received in second collection area 20). This movement by second conveying device 28 toward second collection area 20 provides support to the incoming articles to help maintain the articles in an upright position. In addition, immediately prior to or occurring substantially simultaneously with the movement of article row 24 in movement direction 52 from end 16 of first collection area 14 toward second collection area 20 (as permitted by barrier 30) and movement by second conveying device 28 in movement direction 56 substantially simultaneously toward second collection area 20, separator 32 is moved to a retracted position 82 to more easily facilitate movement of article row 24 into second collection area 20. Upon second collection area 20 receiving article row 26, second conveying device 28 is moved away from second collection area 20. Generally simultaneously or a short period of time soon thereafter, separator 32 is moved to an extended position 84 to provide separation or a spacing between article row 24 and article row 26.

As collectively shown in FIGS. 2, 5, 6, 7, 8 and 11, the previously described movements of second conveying device 28 and separator 32 correspond to article row 26 being received and properly positioned in second collection area 20. If for some reason one or more articles 12 of article row 26 are improperly positioned or misaligned in second collection area 20, such as article(s) 12 not properly dropping into position along a first conveying device portion 46, such misalignment would be sensed by a sensor such as an optical sensor 104 and corresponding reflector 106, due to the misalignment blocking a beam 108 transmitted between optical sensor 104 and reflector 106. In response to blockage of beam 108, an intermediate or corrective operating mode is initiated for a predetermined time, resulting in one or more of additional movement(s) along movement direction 56 of second conveying device 28, movement(s) along movement direction 52 of separator 32, delivery of pressurized gas from pressurized gas delivery device 38, as previously discussed above, and/or movements along a movement direction 124 of first conveying device portion 48 to facilitate movement of the misaligned articles into the desired aligned arrangement or position of article row 26 in second collection area 20.

As shown in FIGS. 9 and 11-14, second conveying device 28 includes a first conveying device portion 46. First conveying device portion 46, such as a continuous belt, extends across at least a portion of the width of frame 11 substantially transverse to first conveying device 18 and is configured to contact a first section 40 of articles of article row 26, such as along a lower portion or a bottom surface of the articles.

As shown in FIGS. 9 and 11-14, second conveying device 28 further includes a second conveying device portion 48, such as a continuous belt. Second conveying device 28 includes a frame 114 rotatably supporting second conveying device portion 48 that is rotatably driven by a motor 49. As further shown in FIG. 13, second conveying device portion 48 includes a plurality of conveying members 50 acting to convey articles of article row 26 for subsequent processing by virtue of contact of conveying members 50 with respective second sections 42, such as lateral surfaces, of articles of article row 26. In addition, conveying members 50 help regulate an operational cycle of second conveying device portion 48. As further shown in FIG. 13, second conveying device 28 includes a pair of proximity switches 110, 112 positioned opposite of second collection area 20. During operation of second conveying device portion 48, a conveying member 50 actuates proximity switch 110, causing deceleration of second conveying device portion 48, with conveying member 50 actuating proximity switch 112 when second conveying device portion 48 is stopped.

While the described embodiment of the previously discussed second collection area 20 shows only one article row, such as article row 26 contained in second collection area 20 (FIG. 5), in another embodiment, such as shown in FIG. 15, second collection area 20 may be configured to receive at least two rows of articles. In the embodiment of FIG. 15, separator 32 maintains separation or a spacing between the two article rows 26' contained in second collection area 20 and between the article row 24 positioned along an end 16 of first conveying device 18 (FIG. 5). In another embodiment, separator 32 could be configured to operate in a movement direction different than movement direction 52 (FIG. 9), including rotational movement, while achieving the desired separation between the collective article rows 26' in the second collection area and the article row 24 positioned along an end 16 of first conveying device 18 of first collection area 14 (FIG. 5).

Although as shown in FIG. 5, in which second collection area 20 is positioned vertically below first collection area 14, which is believed to facilitate separation between the article rows, in another embodiment, first and second collection areas 14, 20 may be located at substantially the same vertical position.

In one embodiment, the barrier can include a gate, such as a guillotine gate. In other embodiments, the barrier, or portions thereof, can swing in any direction toward and/or away from the end of the first collection area. That is, the barrier can include any arrangement having any movement direction(s) that results in selectable or controlled movement of article row(s) from the end of the first collection area to the second collection area.

It is to be understood that while the barrier previously described is movable to prevent an article row from reaching the second collection area 20, in an alternate embodiment, the barrier could be configured to also incorporate the function of the separator, e.g., by moving the article row in which the barrier is in contact in a movement direction away from second collection area 20 to also achieve the desired separation from the article row already received in second collection area 20.

It is to be understood that the apparatus and method of the present disclosure are usable for articles of polyethylene terephthalate (PET) or other materials exhibiting a mutual "sticking" effect, or susceptibility to cohesively group together. However it is also to be understood that the apparatus and method of the present disclosure are usable for articles that are not typically considered to have such susceptibilities.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An apparatus for separating articles susceptible to cohesive grouping, comprising:
   a first collection area having an end and including a first conveying device for collecting and conveying an array of articles arranged in a plurality of rows toward a second collection area;
   the second collection area configured to receive at least one row of articles from the end of the first collection area, the second collection area including a second conveying device for conveying the at least one row of articles from the second collection area;
   a selectably movable barrier positioned in close proximity to the end of the first collection area for controlling movement of the at least one row of articles between the end of the first collection area and the second collection area; and
   a selectably movable separator positionable between the end of the first collection area and at least a portion of the second collection area;
   wherein upon the second collection area receiving the at least one row of articles from the end of the first collection area, the separator maintaining a spacing between the row of articles controllably positioned along the end of the first collection area by the barrier.

2. The apparatus of claim 1, wherein the first conveying device operates continuously or intermittently.

3. The apparatus of claim 1, wherein the barrier includes a member extending along the end of the first collection area movable in a direction toward the end of the first collection area to selectably control movement of the at least one row of articles between the end of the first collection area and the second collection area.

4. The apparatus of claim 3, wherein the barrier applies a compressive force between the member and the end of the first collection area to opposed sections of articles of the at least one row of articles.

5. The apparatus of claim 1, wherein the barrier includes a pressurized gas delivery device for positioning the at least one row of articles in the second collection area.

6. The apparatus of claim 1, wherein the separator extends toward the end of the first collection area while the at least one row of articles is conveyed from the end of the first collection area to the second collection area.

7. The apparatus of claim 6, wherein the separator extends away from the end of the first collection area toward the second collection area after the at least one row of articles is conveyed to the second collection area.

8. The apparatus of claim 1, wherein the barrier also operates as a selectably movable separator.

9. The apparatus of claim 1, wherein the second collection area includes a first conveying device portion configured to contact first sections of articles of the at least one row of articles.

10. The apparatus of claim 9, wherein the second collection area includes a second conveying device portion configured to contact second sections of articles of the at least one row of articles.

11. The apparatus of claim 10, wherein the second conveying device portion includes a conveying member for conveying the at least one row of articles from the second collection area.

12. The apparatus of claim 10, wherein the second conveying device is movable toward the end of the first collection area while the at least one row of articles is being conveyed from the end of the first collection area to the second collection area.

13. A method for separating articles susceptible to cohesive grouping, comprising:
   providing a first collection area having an end and including a first conveying device for collecting and conveying an array of articles arranged in a plurality of rows toward a second collection area; the second collection area configured to receive at least one row of articles from the end of the first collection area;
   conveying the at least one row of articles from the end of the first collection area to the second collection area;
   separating the at least one row of articles in the second collection area from an adjacent row of articles arranged along the end of the first collection area, the adjacent row of articles remaining within the first collection area; and
   conveying the at least one row of articles from the second collection area while maintaining separation from the adjacent row of articles arranged along the end of the first collection area.

14. The method of claim 13, wherein a second conveying device conveys the at least one row of articles from the second collection area.

15. The method of claim 14 wherein conveying the at least one row of articles from the end of the first collection area to the second collection area includes moving the second conveying device toward the end of the first collection area.

16. The method of claim 13 wherein after conveying the at least one row of articles from the end of the first collection area to the second collection area, an adjacent row of articles is positioned along the end of the first collection area.

17. The method of claim 16, wherein subsequent to receiving the at least one row of articles in the second collection area, the second conveying device is moved away from the end of the first collection area.

18. The method of claim 17, wherein simultaneously or soon after the second conveying device is moved away from the end of the first collection area, a spacing is formed between the at least one row of articles in the second collection area and the adjacent row of articles positioned along the end of the first collection area.

19. The method of claim 13, wherein the second collection area is vertically positioned below the first collection area.

20. The method of claim 13, wherein conveying the at least one row of articles from the end of the first collection area to the second collection area includes delivering a pressurized gas to the at least one row of articles.

* * * * *